Dec. 27, 1927.

E. N. STICKLER

GAUGE

Filed Dec. 29, 1926

1,654,388

Eugene N. Stickler,
INVENTOR

BY Victor J. Evans
ATTORNEY

WITNESS:

Patented Dec. 27, 1927.

1,654,388

UNITED STATES PATENT OFFICE.

EUGENE N. STICKLER, OF NEW YORK, N. Y.

GAUGE.

Application filed December 29, 1926. Serial No. 157,829.

This invention relates to gauges for use in measuring the sizes of drills, numbers of wire, etc.

Another object of the invention comprehends a dial for automatically recording a measurement.

With the above and other objects in view, the invention further consists of the following novel features and details of construction, to be hereinafter more fully described, illustrated in the accompanying drawing, and pointed out in the appended claim.

Figure 1:
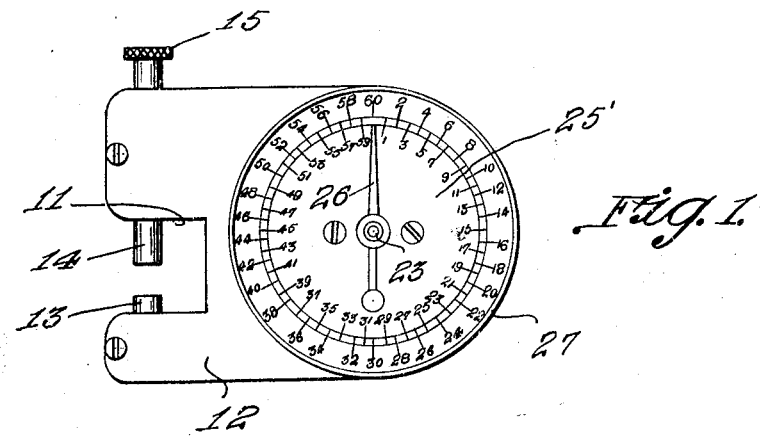
Figure 1 is an elevation of the invention.
Figure 2:
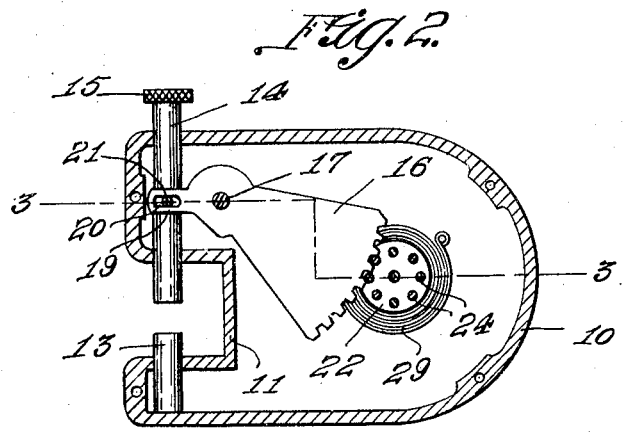
Figure 2 is a similar view with the dial and cover plate removed.
Figure 3:
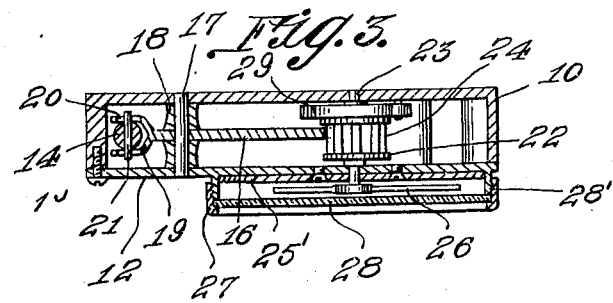
Figure 3 is a sectional view taken on line 3—3 of Figure 2.

Referring to the drawing in detail, wherein like characters of reference denote corresponding parts, the reference character 10 indicates a housing provided with a cut out portion 11. A cover plate 12 of a configuration similar to that of the housing encloses the housing. A pin 13 rigidly retained within the housing is projected an appreciable distance within the cut out portion 11. A slidably mounted pin 14, of substantially greater length than the pin 13, is disposed within the opposed side wall of the cut out portion 11 and in direct alignment with the opposed end of the pin 13. A knurled cap 15 is carried upon the outer end of the pin 14. A segmental gear 16 is pivotally mounted within the housing 10 as indicated at 17 and spaced equi-distantly between the bottom of the housing and the inner side of the cover plate 12 therefor by spacing thimbles 18. An offset and bifurcated portion 19 carried by the segmental gear 16 is provided with elongated slotted portions 20 within the legs formed thereby and adapted to receive therein a pin 21 projected transversely of the pin 14. Spaced companion disks 22 carried upon a shaft 23 have interposed between the adjacent peripheries thereof a multiplicity of cylindrical rods 24 disposed in the path of movement of the segmental gear 16 and adapted for meshing engagement with the teeth thereof. A pointer hand 26 carried upon the outer end of the shaft 23 is adapted to race across the face of a calibrated dial 25' carried upon the outer surface of a cover plate 11. A rim 27 retains a transparent lens 28 upon the periphery of an annular flange 28' upon the outer surface of the cover plate 12. A spring 29 connected with the shaft 23 has the opposed end thereof anchored within the housing 10 for retracting the pointer hand to a neutral position.

In the use and operation of the invention a drill, a length of wire, bearing shafts and other bodies to be calculated are disposed between the ends of the respective pins 13 and 14. The cap 15 is then engaged and the pin 14 depressed to bring its inner end into contact with the work resting upon the end of the pin 13. This operation will rock the segmental gear 16 upon its pivot 17 and accordingly rotate the disks 22 and shaft 23. The pointer hand 26 will accordingly be moved across the face of the dial 25' to record the measurement of the work. When the reading has been taken the pin 14 is released and the spring 29 will automatically retract the position of the pointer hand 26. The disk 25' may be calibrated to indicate measurements of various work, namely, the sizes of drills, numbers of wire, etc.

The invention is susceptible of various changes in its form, proportions and minor details of construction, and the right is herein reserved to make such changes as properly fall within the scope of the appended claim.

Having thus described the invention, what I claim is:

A device of the character described comprising a housing having a cut-out portion, a cover plate therefor, a pin rigidly mounted within the housing and projecting an appreciable distance within the cut-out portion, a pin slidably mounted within the housing and projected within the opposed side of the cut-out portion in alignment with the aforementioned pin, a toothed segment mounted for rocking movement within the housing and operatively connected with the slidably mounted pin, a shaft mounted within the housing adjacent the toothed portion of the segment, spaced disks carried by the shaft having cylindrical rods interposed therebetween adjacent the peripheries thereof for meshing engagement with the teeth of said segment, a calibrated dial carried by the cover plate for recording a measurement between the adjacent ends of said pins, and a spring anchored within the housing and connected with the shaft to retract said pointer hand to a neutral position upon releasing the slidably mounted pin.

In testimony whereof I affix my signature.

EUGENE N. STICKLER.